Figure 7:
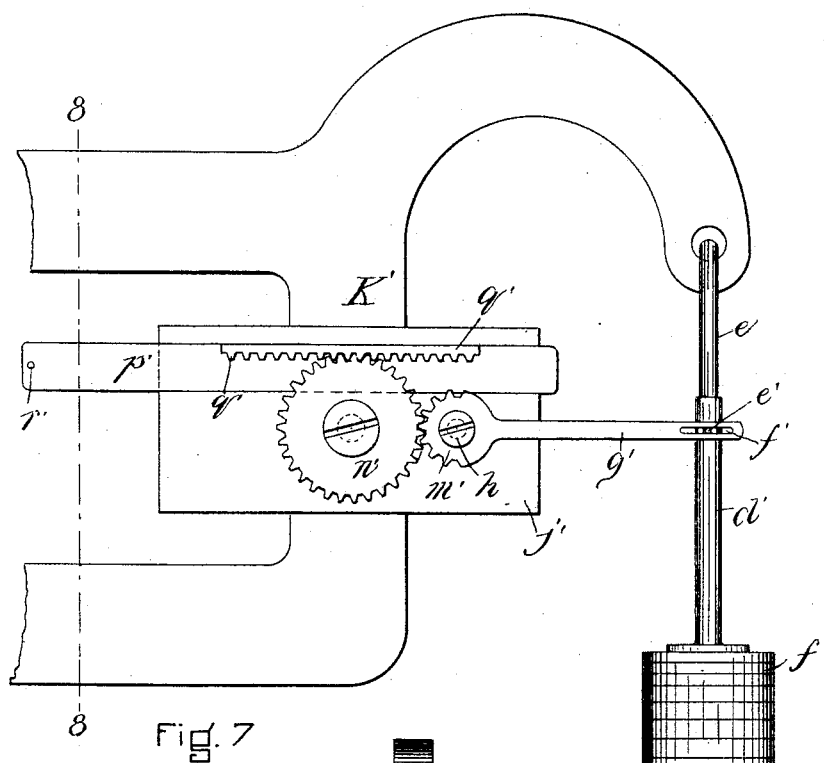

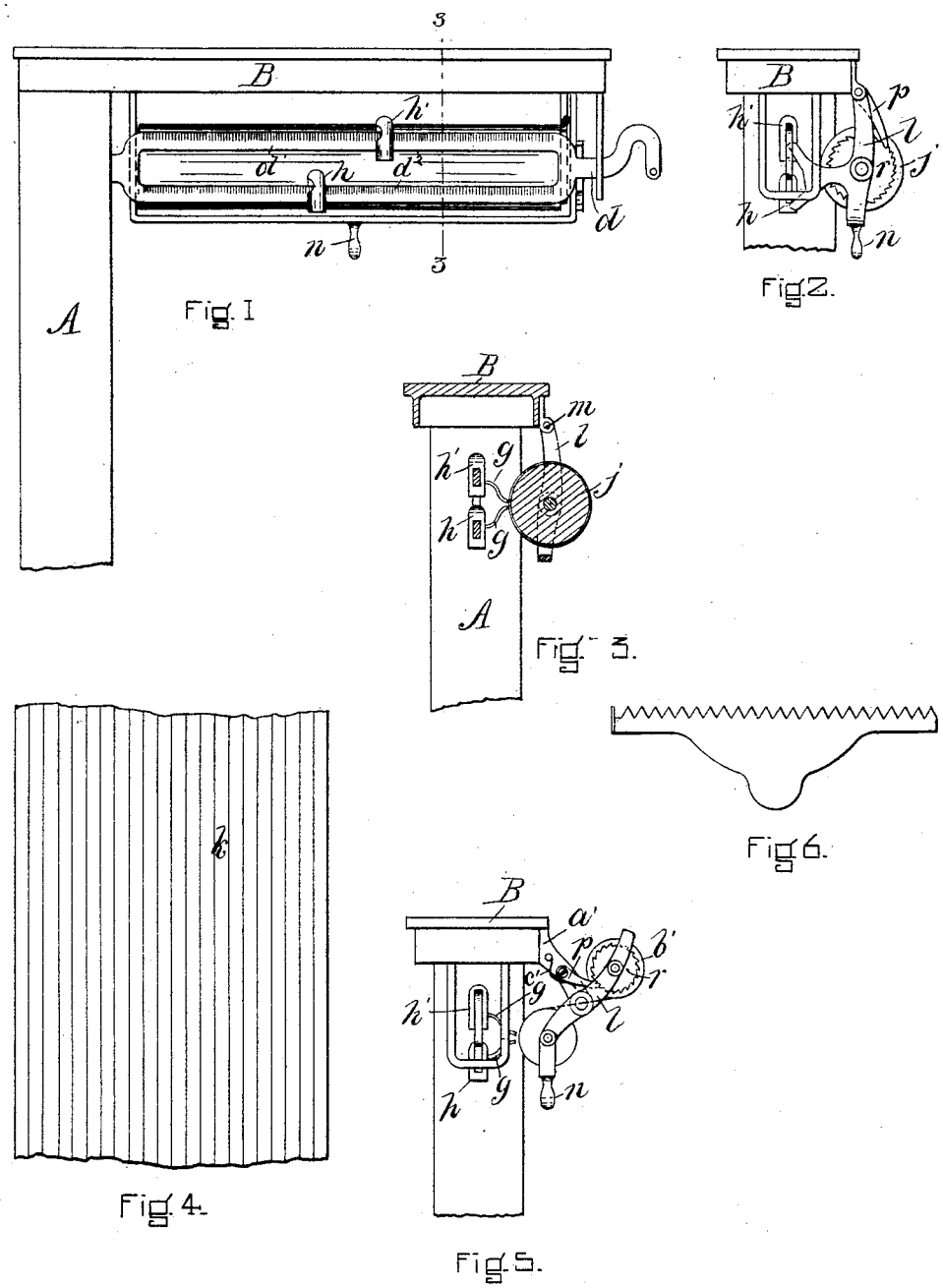

(No Model.) 2 Sheets—Sheet 2.

G. E. MILLER.
RECORDING DEVICE FOR SCALES.

No. 472,642. Patented Apr. 12, 1892.

WITNESSES.
Robert Wallace.
C. E. Nolte.

INVENTOR.
George E. Miller,
by Wm A. Macleod
his Atty

UNITED STATES PATENT OFFICE.

GEORGE E. MILLER, OF LYNN, ASSIGNOR TO WILLIAM A. MACLEOD AND BENJAMIN DICKERMAN, OF BOSTON, MASSACHUSETTS.

RECORDING DEVICE FOR SCALES.

SPECIFICATION forming part of Letters Patent No. 472,642, dated April 12, 1892.

Application filed November 15, 1890. Renewed March 10, 1892. Serial No. 424,394. (No model.)

*To all whom it may concern:*

Be it known that I, GEORGE E. MILLER, of Lynn, county of Essex, State of Massachusetts, have invented certain new and useful Improvements in Recording Devices for Scales, of which the following is a specification.

In establishments where there is a great deal of weighing to be done, as in grain-elevators and the like, it becomes important that the correct weight of the scales each time they are used be noted. These establishments frequently employ a number of scales and the person in charge who sees that the scale is balanced after the weight is placed upon it and then takes a note of the weight in a book is constantly employed in passing from one scale to another, balancing the scale and taking an account of the weight. One man can in this way attend to a number of scales; but if he were relieved from the necessity of noting the weight in a book he could attend to a larger number of scales. It also happens that in doing this work, which is to a considerable extent routine work, mistakes are made in writing down the weight which is indicated by the scales, or figures are not carefully made, and are thus liable to be copied wrongly—as, for example, an "8" may be copied as a "3." In this way considerable losses occur which it would be desirable to avoid.

My invention has for its object to produce a recording device which may be applied to beam-scales, and which will enable the weigher by very slight exertion and without loss of time to record accurately the weight on the scale, and this he may do either in addition to taking a note of the weight in a book, as heretofore, or he may dispense with the use of the book altogether and record the weight by my apparatus, in which case he will be enabled to attend to a greater number of scales.

My invention consists in the device hereinafter described, and which consists of a roll or strip of paper or similar material suitably mounted behind the beam of the scale and adapted to be brought into contact with markers secured to the sliding weights on the beam for the purpose of indicating the position of the said weights on the beam at a given time, and, further, in the combination, with this paper, of a marker attached to the beam or to a support adjacent thereto and connected by suitable mechanism with the weights, which are suspended from the end of the beam, whereby the number of said weights so suspended and the weight represented thereby may be recorded, all as hereinafter set forth, and as is more particularly pointed out in the claims which are appended hereto and made a part hereof.

My invention is simple and will be readily understood from the following description and the accompanying drawings, in which my device is shown in the best form now known to me, and in which—

Figure 8:
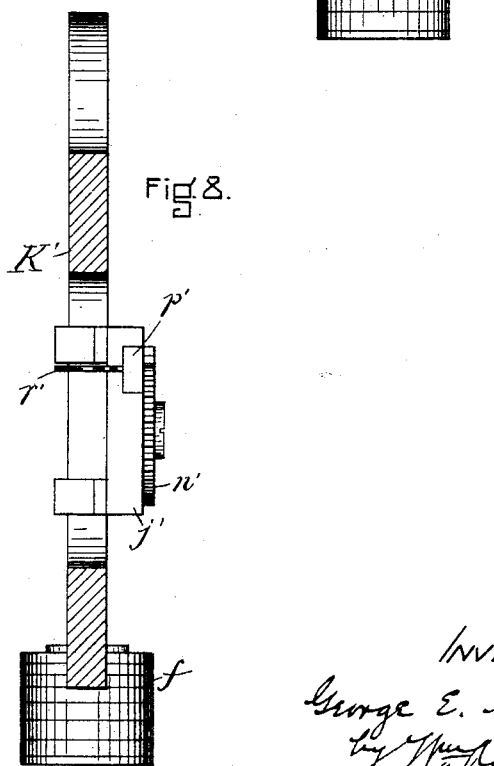

Figure 1 is a front elevation showing the upper part of the frame of a scale and the scale-beam with my improvement attached. Fig. 2 is an end elevation of the same. Fig. 3 is a section on line 3 3, Fig. 1. Fig. 4 shows the strip of paper on which the weight is registered. Fig. 5 is a modification of the device adapted to accommodate a longer strip of paper and showing two rolls, the strip of paper being paid off the lower roll where the weight is recorded and wound on the upper roll. Fig. 6 is a plan view of a strip of metal or similar material which is graded to correspond with the gradations on the beam of a scale, and by employing which the weight indicated at any time on the strip of paper may be ascertained whether the paper used be plain or marked with gradations, as hereinafter more fully explained. Fig. 7 is an elevation of the end of a scale-beam, showing that part of my device by which the weight suspended from the beam is indicated on the strip of paper. Fig. 8 is a section of the same on line 8 8, Fig. 7.

A is the upper portion of the wooden frame or covering of an ordinary beam-scale. B is the top portion of said frame, which serves as a cover and protection for the beam.

The beam of the scale is shown at $d$, and it may be provided with two graded portions $d'$ and $d^2$, forming the well-known double beam in common use. The free end of the beam projects outwardly, and is usually curved in a well-known manner, as shown, Figs. 1 and 7, and from this curved portion is suspended a rod $e$, which is pivoted thereto and on which the weights $f$ are placed. (See Fig. 7.) On the graded portions $d'$ $d^2$ of the beam are placed sliding weights or riders $h$ $h'$, by shifting which the beam is made to balance and the fractions of weight are determined. To each of these riders I secure in any suitable manner a projecting finger or marker $g$, (see Figs. 3 and 5,) so shaped as to project in the case of the double-beam scale in such manner that their free ends will be near together or nearly in the same plane. These markers may be provided, if desired, at their free ends with lead or other material to make a mark on the paper, or they may be simply metal and so pointed that they will impress the paper when it is forced against them. The paper upon which they are designed to mark is preferably mounted upon a roll $j$, which may be of wood with a covering of rubber, or which may be of other suitable material, and upon which the strip of paper $k$ is wound or placed and secured in any suitable manner. The roll $j$ is pivoted in a frame $l$, preferably of metal, said frame being hinged, as shown at $m$, to the cover or cross-piece B of the scale. Below the frame $l$ a handle $n$ is provided, (see Fig. 1,) so that the operator may easily draw the roll $j$ toward the riders $h$ $h'$, thereby forcing it against the markers $g$ and making a mark upon the paper at the point opposite the rider on the beam. The frame $l$ is so hung that the roll $j$ will be normally clear of the markers, so that after the operator lets go of the handle $n$ the roll will swing back clear of the markers and the riders $h$ $h'$ will be free to be moved again, as desired. After the roll has been drawn against the marker to indicate the weight shown on the beam of the scale at a given time it is desirable that the roll should move in order to present another portion of the paper thereon to the markers the next time the roll is drawn forward by the operator. This may be accomplished in various ways. I have provided for the purpose a pawl $p$, (see Fig. 2,) which co-operates with a ratchet $r$, fast to the end of the roll $j$. As the roll $j$ is drawn forward by the operator to record the weight on the scale the pawl $p$ slips over one tooth, and as the roll $j$ swings back again after the handle $k$ is released the ratchet will force the roll $j$ around the distance of one tooth, and thus a new part of the paper strip will be presented to the markers the next time the roll $j$ is drawn forward. As only a small portion of the paper strip is used each time a weight is recorded, it will be clear that a comparatively small roll will accommodate a strip of paper of sufficient length to record a large number of weights. If, however, it is desirable for any purpose to use a long strip of paper and thus to provide for the continued use of the scale for a long time without renewing the strip of paper, a device such as is shown, Fig. 5, may be employed, in which the frame $l$ is pivoted between downwardly-projecting arms $a'$, which are secured rigidly to the top B of the frame of the scale. In this case the frame is large enough to accommodate two rolls, one of which takes up the paper as the other gives it off. The supplementary roll $b'$, which takes up the paper, carries the ratchet $r$, and the pawl $p$ is pivoted to one of the arms $a'$ and is kept in contact with the ratchet by a spring $c'$. As the frame is swung forward in recording, the pawl slips over one ratchet-tooth, and as the frame moves back to its normal position the upper roll $b'$ is turned sufficiently to move the paper forward until a new portion of the strip is exposed to the markers. The strip of paper employed should be of a definite width and is either plain or may be lined to correspond with the gradations on the beam of the scale. It is also desirable, for convenience, to mark the strip at intervals with a series of figures indicating the gradations in the same manner as the beam of the scale is marked. If, however, a perfectly plain strip of paper is employed, a graded scale or marking device similar to that shown in Fig. 6 is provided graded in the same manner as is the beam of the scale, and when this is applied to the strip the weight indicated by the markers will be shown.

If a double beam is used like that shown in Fig. 1, and the gradations on one beam differ from those on the other, the paper strip, if lined to represent the gradations, would require to have an additional series of lines, which might be in colored ink to represent the second set of gradations. As a rule, however, the gradations on both parts of the beam are alike, and it will not be necessary to provide more than one scale on the paper.

For the purpose of recording the weight indicated by the weights which are hung from the end of the beam I have provided a device like that shown in Fig. 7 to co-operate with the strip of paper. This device consists of a sleeve $d'$, which is placed on the rod $e$, which carries the weights $f$. This sleeve is placed loosely on the rod $e$, so that it may be raised when the weights $f$ are put on or taken off, and so that it will normally rest on top of the weights. Toward the upper end of the sleeve $d'$ is set a stud $e'$, which projects into a slot $f'$ lengthwise of the arm $g'$. The inner end of the arm $g'$ is enlarged and pivoted at $h'$ to a stationary base-piece $j'$, which is screwed or otherwise secured to the vertical connecting portion K' of the beam, if a double beam is used, or to a projection from the beam, if a single beam is used. The enlarged portion of the arm $g'$ is provided with a toothed sector $m'$, which co-operates with a pinion $n'$, which is also mounted on the stationary piece $j'$. A horizontal sliding piece $p'$ is mounted in a groove or in ways on the stationary piece $j'$, (see Fig. 8,) so that it may slide thereon, and is provided with a rack $q'$, with which the pinion $n'$ meshes. At the inner end of the horizontal sliding piece $p'$ is set a marker $r'$ similar to the markers $g$, which are provided on the riders $h\ h'$ of the beam. As the roll $j$ is drawn forward by the operator toward the markers $g$ the strip of paper will come in contact with the marker $r'$, and the position of the marker $r'$ will be recorded at the side of the strip and outside of the gradations which indicate the position of the riders. It will be clear that in this way the position of the marker $r'$ at any time may be noted. It will also be clear that if the number of weights suspended on the rod $e$ be varied the position of the sleeve $d'$ will be varied, and consequently the position of the marker $r'$. For example, if the weights $f$ were removed the sleeve $g'$ would drop to the lower end of the rod $e$, thus moving the arm $g'$, turning the pinion $n'$, and throwing the marker $r'$ farther over on the paper strip. At the end of a day or other period of time the paper which has been used may be removed and filed away for reference, thus affording an accurate record of the various amounts which have been weighed. The device is simple and inexpensive in construction, may be applied to scales at present in use, and furnishes a permanent record of the work done.

What I have termed the "marker," which is a projection from the rider or sliding weight on the beam of the scale, is preferably secured, as I have heretofore described it and as it is shown in the drawings, directly to the rider or sliding weight; but it will be clear that this is not essential. The party using the scale might be provided with a marker wholly separate from the scale or from my attachment, or he might use a common lead-pencil, by the aid of which he could put a mark on the strip of paper to indicate the position of the riders or sliding weights $h\ h'$.

What I claim is—

1. The combination, with a scale, of a roller mounted in proximity to the beam of said scale and parallel therewith, a strip of paper or similar material applied to the said roller, and a marker whereby the position of the weight on the scale-beam may be indicated on the said paper, substantially as shown and described.

2. A recording device for scales, consisting of a marker secured to the rider on the beam of the scale and a strip of paper or similar material mounted in proximity to said marker and adapted to be moved against the same to record the position of the rider on the beam, substantially as shown and described.

3. A recorder for scales, consisting of a marker secured to the rider on the beam of the scale and a roll provided with a covering of paper or similar material, said roll being mounted in a swinging frame in proximity to said marker, whereby the roll may be forced against the marker to record the position thereof at a given time, substantially as shown and described.

4. The combination, with the beam of a scale and its rider, of a marker $g$, a roll, as $j$, its pivoted frame $l$, and suitable mechanism for turning the roll at each movement of its frame to expose a new portion of the paper, substantially as shown and described.

5. The combination, with the beam of a scale, of a marker $r'$, a movable piece, as $p'$, mounted on said beam, to which said marker is secured, actuating mechanism for said piece connected with the weights suspended from the beam, and a strip of paper mounted in proximity to said marker and adapted to be moved into contact therewith, whereby as the number of weights suspended from the beam is increased or diminished the position of the marker will be changed and the weight may be recorded, substantially as set forth.

6. The combination, with a scale, of a strip of paper or similar material mounted in proximity to the beam of said scale, a rider on said beam and a marker therefor, a movable piece, as $p'$, and a marker thereon, and actuating mechanism for said movable piece, whereby the position of the movable piece is governed by the number of weights suspended from the beam, substantially as shown and described.

7. The combination, with a scale, of a strip of paper or similar material mounted in proximity to the beam of said scale, a movable piece, as $p'$, and a rack thereon, a pinion $n'$, sector $m'$ and its arm $g'$, and a sleeve $d'$, resting on top of the weights suspended from the beam of the scale, whereby as the number of said weights is increased or diminished the position of the movable piece $p'$ will be changed, for the purposes and substantially as shown and described.

GEORGE E. MILLER.

Witnesses:
HOWARD L. MILLER,
NELLIE J. MILLER.